F. HEDLEY & J. S. DOYLE.
COMBINED LIFE FENDER AND WHEEL GUARD CONSTRUCTION.
APPLICATION FILED MAR. 20, 1914.
1,183,560.
Patented May 16, 1916.
2 SHEETS—SHEET 1.
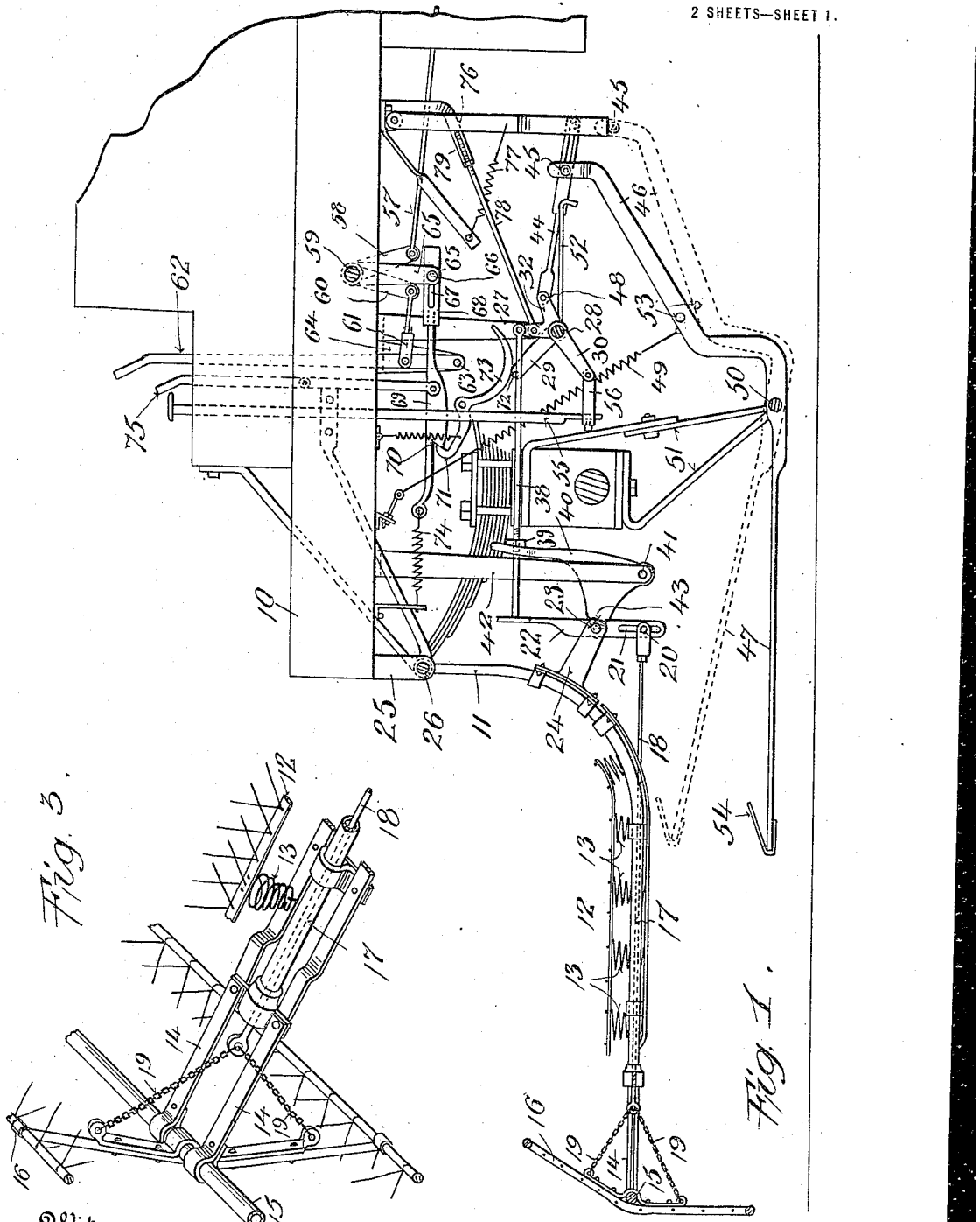

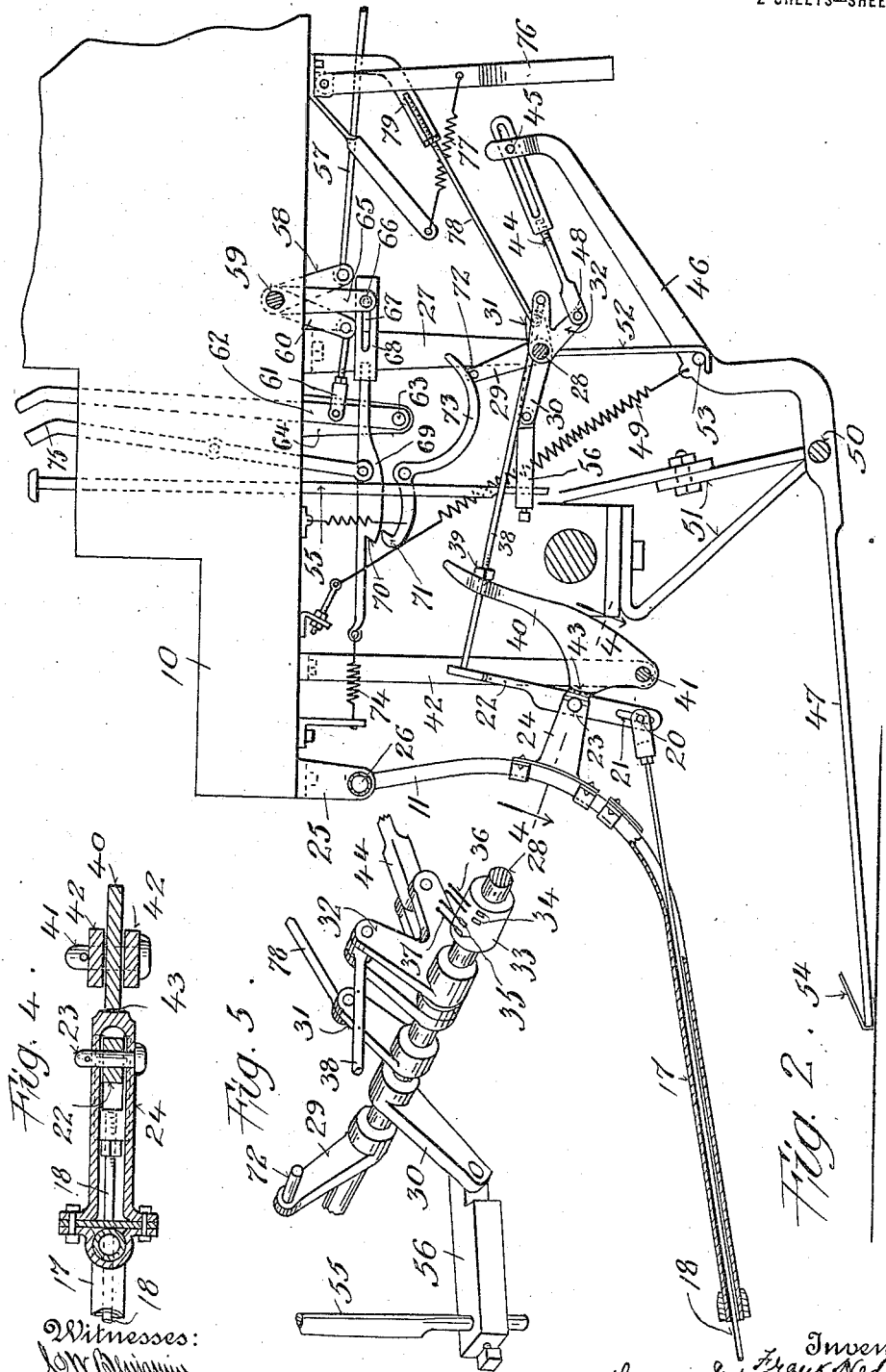

UNITED STATES PATENT OFFICE.

FRANK HEDLEY, OF YONKERS, AND JAMES S. DOYLE, OF MOUNT VERNON, NEW YORK.

COMBINED LIFE-FENDER AND WHEEL-GUARD CONSTRUCTION.

1,183,560.        Specification of Letters Patent.        Patented May 16, 1916.

Application filed March 20, 1914. Serial No. 825,963.

*To all whom it may concern:*

Be it known that we, FRANK HEDLEY and JAMES S. DOYLE, both citizens of the United States, and residing, respectively, at Yonkers and Mount Vernon, in the county of Westchester and State of New York, have made a certain new and useful Invention in Combined Life-Fender and Wheel-Guard Constructions, of which the following is a specification.

This invention relates to combined life fender and wheel guard constructions, and particularly to such constructions of the type shown, described and claimed in our prior application Serial No. 792,416, filed Sept. 29, 1913.

The object of the invention is to provide a combined fender and wheel guard which is simple in construction, economical to manufacture, easy of attachment and application to vehicles of various kinds, and efficient in operation.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the accompanying drawings and to the various views and reference signs appearing thereon, Figure 1 is a view in side elevation, parts in vertical section, showing a construction of combined life fender and wheel guard embodying the principles of our invention, applied to the front end of a vehicle, and showing the normal position of the parts when ready for action. Fig. 2 is a view similar to Fig. 1 showing the parts in their tripped position. Fig. 3 is a fragmentary view in perspective showing the means for supporting the auxiliary trip fender. Fig. 4 is a broken detail view in section on the line 4, 4, Fig. 2. Fig. 5 is a fragmentary view in perspective showing the trip shaft and its associated parts.

The same part is designated by the same reference numeral wherever it occurs throughout the several views.

In our prior application, above referred to, we have shown, described and claimed a construction of combined life fender and wheel guard wherein a life fender is supported upon the front end of a vehicle, or upon the truck thereof, and is provided with an auxiliary trip frame or gate having such arrangement and connections as to cause the wheel guard to be tripped whether said trip gate be rocked in one direction or the other, and wherein provision is made for automatically shutting off power from the vehicle propelling motor and applying the brakes in case of collision with a pedestrian and the resultant tripping of the guard. The present invention relates to apparatus of this same nature and embodies certain improvements therein which will be hereinafter set forth.

In the drawings 10 designates the front end of a vehicle which may be a street car, motor truck, automobile, or the like, and 11 a fender frame, supported at its rear edge upon the vehicle. This frame extends forwardly from the front end of the vehicle, and yieldingly supports a cushion frame or fender platform 12. In the form shown, the fender platform 12 is supported upon springs 13, carried by the fender frame 11. The purpose of the cushion frame 12 is to receive the impact of a body thrown upon the fender, thereby avoiding the danger of such body being injured by being thrown upon a hard unyielding part of the fender frame.

The fender frame 11 is provided with bracket arms 14, which extend forwardly from the front edge thereof, and which support at their front ends a rod 15 which constitutes the hinge axis of the auxiliary gate 16. The structure, relation and function of this auxiliary gate are all the same as set forth with respect thereto in our pending application above referred to. Supported by the fender frame 11 is a longitudinally extending tubular member 17, through which works a rod 18, to the front end of which the chain or other connections 19, respectively, extend to and are connected with the auxiliary trip gate 16, on opposite sides of the pivotal axis thereof, whereby when said gate is rocked, whether in one direction or the other, the rod 18 is drawn longitudinally forward. At its rear end the rod 18 carries a pin 20 which works in an elongated slot 21, in a rocking member 22. This rocking member is pivotally mounted intermediate its ends upon a pin or stud 23, which is mounted in the forked arm 24, clamped upon and extending rearwardly from the fender frame 11.

The parts so far described are all carried by or form parts of the fender frame, and the latter, as above indicated, is pivotally mounted at its rear upwardly extending edge in suitable brackets 25 carried by the vehicle frame 10. From this it will be seen that the fender frame has only the hinge connection 26 with the vehicle frame or its truck, which is afforded by its rear edge. This is one of the features of improvement of our present invention, in that it enables the fender to be swung upwardly bodily about its hinge axis 26 and out of the way when it is not required for use.

The provision of the tubular member 17 through which the rod 18 works is another feature of improvement contemplated by our invention, in that thereby a straight pull is exerted upon said rod 18 whenever the trip gate 16 is rocked, whether in one direction or the other, thereby reducing friction and rendering the tripping action of the gate more easily accomplished.

Carried in suitable brackets or hangers 27, depending from the vehicle body, is a rock shaft 28, upon which are mounted the crank arms 29, 30, 31 and 32. Also mounted on said shaft is an insulating sleeve 33, carrying contacts 34, 35, respectively with which coöperate brushes or contacts 36, 37, included in electrical circuits for controlling the propelling motor and the electrical application of the brakes, as more fully explained in our former application. The arm 32 is in the form of a bell crank lever, to one arm of which is connected a rod 38. This rod extends forwardly into position to be engaged by the rocking member or trip lever 22, when the latter is rocked by the rocking movement or displacement of the auxiliary trip gate 16. Also engaging the rod 38, or an adjustable nut 39, thereon is the forked end of a rock member 40, said member being pivotally mounted as at 41, between the brackets or hangers 42, depending from the vehicle body. The front edge of the rock member 40 is formed into a bearing surface 43, which takes bearing against the rear end of the bracket 24, as clearly shown. This arrangement marks a valuable and important feature of our present invention in that it affords means for automatically tripping the wheel guard, presently to be more fully described, without depending upon the rocking movement of the auxiliary gate 16. For instance it might happen in case of collision with a pedestrian or for other cause, a person may be thrown onto the fender frame 11, as, for instance, from the side thereof, without rotatively displacing the trip gate 16. In such case the weight of the person thus imposed on the fender frame will cause the latter to yield downwardly in a swinging movement about its pivotal axis 26, thereby causing the rear end of the yoke member 24, to bear against the surface 43 of member 40, and rock the latter about its pivot 41, and hence causing the forked upper end thereof to engage the adjustable nut or stop 39, on the trip rod 38 and project the latter rearwardly and endwise in the same manner as when the trip lever 22 is rocked by the rod 18, the front end of the trip rod 38, being engaged against the upper end of said trip lever 22. The other arm of the bell crank 32 is connected as at 48 to a rocking member 44, which is pivotally supported, as at 45, in the upturned rear end of a frame 46, which carries the wheel guard or apron 47. When the parts are in their normal positions, as shown for example in Fig. 1, a line drawn through the axes 28, 48 and 45, makes an angle with a line drawn through the axes 28 and 45, thereby forming, in effect, a knuckle joint, the parts being held in this relation in any suitable manner, as for instance, by means of a spring 49, which exerts its tension on the guard frame 46 in a direction to rock the same so as to carry the apron 47 thereof down into its inclined or "pick up" position, as shown in Fig. 2. When however, the bell crank lever 32 is rocked sufficiently to carry the axis 48 below the line joining the axes 28 and 45, the trip action takes place and the tension of the spring 49 becomes immediately effective to rock the guard apron 47 downwardly. This frame 46, and apron 47 is pivotally mounted as at 50 upon brackets 51 depending from the vehicle truck, and thus, while the fender frame 11 is supported upon the vehicle body, the wheel guard is supported upon the truck, and still these parts are maintained in efficient coöperative relation since, as above explained, the trip rod 38 is projected rearwardly to rock the shaft 28 and trip the guard 47, whether the gate 16 is rocked or whether the fender frame is depressed without rocking the gate 16.

It may sometimes be desirable to lock the guard apron 47 in tripped position, thereby necessitating a resetting of the mechanism in or to restore the same to position ready for use. To accomplish this result we provide the rock shaft 28 with a hook arm 52, which engages a stud 53 on the guard frame 46, when said shaft 28 is rocked and the guard is tripped, as clearly shown in Fig. 2. When the parts are in their retracted or set positions ready for tripping, as seen in Fig. 1, the hook arm is held retracted.

It may sometimes happen that a pedestrian is knocked down by a collision and instead of falling into the basket of the fender frame 11, the body passes underneath the fender frame. In such case the guard 47, which is tripped as above explained, serves to pick up the body and prevent the same from being injured by the underframing or wheels of the truck.

In the operation of the apparatus, it may sometimes occur that when the guard apron 47 properly accomplishes its function of picking up the body, such body may roll off the inclined surface of the tripped guard. To prevent this we provide the front edge of the guard apron with light spring strips 54, which extend rearwardly a short distance over the front edge of the guard. These springs should be sufficiently light to prevent interference with the pick up function of the guard, but they serve to retain a picked up body upon the apron and prevent the same from rolling off the apron when it is once picked up.

After the apron is tripped, it may be reset in condition for use and ready to be again tripped. The resetting may be accomplished in many different ways. A simple arrangement is shown wherein a rod 55 extends into the body of the vehicle in convenient position to be operated by the driver, motorman or chauffeur. This rod carries an arm 56, which is pivotally connected to the arm 30 on shaft 28. By suitably depressing the rod 55 the shaft 28 is rocked in a direction to reset the guard.

It is desirable to effect an application of the brakes coincidently with the tripping of the wheel guard, while at the same time the connections should be such that in normal operation the brakes may be applied and released independently of the operation of the guard. This result may be accomplished in many specifically different ways. We have shown one form of apparatus for accomplishing the purpose, as an exemplification of our invention, wherein the brake rod 57, which applies and releases the brakes in the well known manner, is connected to an arm 58, on a rock shaft 59. On the shaft 59 is another arm 60, which is connected by a link 61, to a brake controlling lever 62, pivotally mounted at 63 in a bracket 64. Through the operation of the brake lever 62 the brakes may be applied or released in the ordinary manner and without reference to the life guard or its operation. A third arm 65 is carried by the shaft 59. This arm is provided with a pin 66 at its end, which works in a slot 67 in a slide block 68. Connected to block 68 is a bar 69, which is provided with a shoulder 70. A detent 71, engages the shoulder 70 and holds the bar 69 against the action of a spring 74, when the parts are in their re-set position ready to be tripped. The arm 29 on shaft 28, carries a pin 72, which engages the tail 73 of the detent 71 when said shaft 28 is rocked, thereby releasing the detent 71 from engaging relation with reference to shoulder 70, thereby permitting the spring 74 to project the bar 69 endwise, and thus to rock the brake operating shaft 59, through the engagement of the pin 66 of the arm 65 with the end of the slot 68, thereby setting the brakes automatically with the tripping of the guard, while, as above explained, the slot and pin connection of the arm 65 and slide block 68, permits the brakes to be operated independently of the guard and its tripping mechanism. The automatic brake trip apparatus may be reset and the brake released in any convenient manner as, for instance, by means of a lever 75, connected to the bar 69.

It may sometimes be desired to lock the guard apron raised out of position for use, as indicated in dotted lines in Fig. 1, but in condition to be tripped in case of emergency by the tripping mechanism therefor above described. We have shown a simple arrangement for accomplishing this wherein a forked rocking member 76 is pivotally suspended from the vehicle body. A spring 77, normally holds this member in vertical position. The end of the rod 44 works through the forked end of member 76. By catching hold of the front edge of the apron 47 and raising the same sufficiently, the frame 46 is rocked until the pivot stud 45 thereon rides underneath the lower end of the member 76, said member 76 thereby forming a lock stop to hold the apron 47 in raised position. In order to release this stop whenever exigency arises, that is, whenever the trip shaft 28 is rocked, a rod 78, connected to the arm 31 on the trip shaft 28 is projected endwise. The free end of this rod rides freely through an opening in a yoke 79, and engages against the member 76, and rocks the same out of detaining position with reference to the stop 45, thereby releasing the guard and permitting it to trip.

It is to be understood that many variations and changes in the details of construction and arrangement might readily occur to persons skilled in the art and still fall within the spirit and scope of our invention, but Having now set forth the object and nature of our invention and a construction embodying the features thereof, what we claim as new and useful and desire to secure by Letters Patent is:

1. The combination with a wheel guard, a tripping mechanism therefor, and a member to release said tripping mechanism, of a fender frame mounted independently of the wheel guard, and a releasing member arranged in the path of movement of said fender frame to be engaged and operated thereby to trip said wheel guard when the fender frame is moved.

2. The combination with a wheel guard, a trip therefor, and a member to release said trip, of a pivotally mounted fender, an arm carried thereby, said trip release member being arranged in the path of said arm to be engaged and operated thereby when said fender is rocked, to release said wheel guard.

3. The combination with a wheel guard, a tripping mechanism therefor, and a releasing rod for said tripping mechanism, of a fender frame movably mounted independently of the wheel guard, means engaged by said fender frame, when moved, to actuate said release rod, and a trip gate also carried by said fender frame to actuate said rod.

4. The combination with a wheel guard, a tripping mechanism therefor, and a release rod for the tripping mechanism, of a fender frame, a rock lever carried thereby and arranged to engage and operate said release rod, and a trip gate pivotally mounted on the fender frame to rock said lever.

5. The combination with a wheel guard, a tripping mechanism therefor, and a release rod for the tripping mechanism, of an independently mounted fender, a lever pivotally mounted thereon, said release rod being arranged in the path of one end of said lever, and a trip gate carried by said fender and connected to the other end of said lever.

6. The combination with a wheel guard, a tripping mechanism therefor, and a release rod for the tripping mechanism, of an independently mounted fender having a tubular member, a lever pivotally mounted on said fender for actuating said release rod, a trip gate carried by said fender, and connections between said gate and lever, said connections operating through said tubular member.

7. The combination with a wheel guard, and a tripping mechanism therefor, of a fender, a lever carried thereby for releasing the tripping mechanism, a rod connected to said lever, a trip gate pivotally mounted intermediate its ends upon said fender, and connections from opposite sides of the pivot of said gate to said rod.

8. The combination with a wheel guard, a tripping mechanism therefor, a fender frame mounted independently of said wheel guard and means located at the front end of said fender frame to release said tripping mechanism, of a lock operated by the tripping of said guard to hold the same in tripped position.

9. The combination with a wheel guard, a tripping mechanism therefor, a fender frame mounted independently of said wheel guard and means located at the front end of said fender frame to release said tripping mechanism, of a hook member controlled by the tripping mechanism, and a lug on the guard to be engaged by said hook member to lock the same in tripped position.

10. The combination with a pivotally mounted wheel guard adapted to be swung out of operative position, a detent to prevent said guard from swinging into operative position, a trip mechanism for said guard, means to automatically release said trip mechanism, said trip release mechanism operating said detent to release said guard.

11. In combination with a pivotally mounted wheel guard adapted to be swung out of operative position of a tripping mechanism therefor, a fender frame mounted independently of said wheel guard, a rock shaft for operating said tripping mechanism, means located at the front end of said fender frame to rock said shaft to actuate the tripping mechanism, and manually operated devices to rock said shaft to reset the tripping mechanism.

In testimony whereof we have hereunto set our hands in the presence of the subscribing witnesses, on this 18th day of March A. D. 1914.

FRANK HEDLEY.
JAMES S. DOYLE.

Witnesses:
H. M. NORRIS,
WARREN MARCUS.

Copies of this patent may be obtained for five cents each, by addressing the "Commissioner of Patents, Washington, D. C."